(12) United States Patent
Galimberti (10) Patent No.: US 9,079,725 B2
(45) Date of Patent: Jul. 14, 2015

(54) DEVICE FOR FORMING PACKS OF PLASTIC BAGS

(75) Inventor: Gianfranco Galimberti, Rignano sull' Arno (IT)

(73) Assignee: I.P.S. S.R.L. INTERNATIONAL PROJECT SERVICES, Florence ( * ) Notice: Subject to any disclaimer, the term of this patent is extended or adjusted under 35 U.S.C. 154(b) by 172 days.

(21) Appl. No.: 13/879,073

(22) PCT Filed: Oct. 14, 2011

(86) PCT No.: PCT/IB2011/002420
§ 371 (c)(1),
(2), (4) Date: May 15, 2013

(87) PCT Pub. No.: WO2012/049563
PCT Pub. Date: Apr. 19, 2012

(65) Prior Publication Data
US 2015/0037130 A1 Feb. 5, 2015

(30) Foreign Application Priority Data

Oct. 15, 2010 (IT) ................ FI2010A0211

(51) Int. Cl.
*B65G 57/14* (2006.01)
*B65H 29/40* (2006.01)
*F16H 3/44* (2006.01)
*B31B 19/98* (2006.01)

(52) U.S. Cl.
CPC ................ *B65G 57/14* (2013.01); *B65H 29/40* (2013.01); *F16H 3/44* (2013.01); *B31B 19/98* (2013.01); *B31B 2219/927* (2013.01); *B65H 2701/191* (2013.01)

(58) Field of Classification Search
CPC .... A24C 5/326; B65G 47/915; B65G 47/848; B65G 29/02
USPC .............. 108/21, 22; 198/377.07, 377.1, 441, 198/471.1, 475.1, 689.1, 750.11, 750.12, 198/797, 817; 271/196, 90, 903; 414/250, 414/27, 732, 738, 791.6, 792.7, 793, 793.4, 414/793.5, 793.7, 793.9, 794, 794.2, 795, 414/797, 797.3, 797.7, 908, 917; 72/405.1, 72/405.12; 74/89.2, 89.21; 901/25
See application file for complete search history.

(56) References Cited

U.S. PATENT DOCUMENTS

| | | | | | |
|---|---|---|---|---|---|
| 3,026,989 | A | * | 3/1962 | Schaltegger | ............... 198/471.1 |
| 3,303,926 | A | * | 2/1967 | Pohl | ............................ 198/471.1 |
| 3,567,011 | A | * | 3/1971 | Pinkham | .................... 198/471.1 |
| 4,558,778 | A | * | 12/1985 | Cristiani | .................... 198/471.1 |

(Continued)

FOREIGN PATENT DOCUMENTS

| EP | 0388686 A1 | 9/1990 |
|---|---|---|
| FI | 2008000087 A1 | 10/2009 |
| WO | 2009133580 A1 | 11/2009 |

*Primary Examiner* — Gregory Adams
(74) *Attorney, Agent, or Firm* — McGlew and Tuttle, P.C.

(57) ABSTRACT

Device (10) for forming packs of bags (P) for moving from a first area (S1), where an already produced bag (P) is arranged, to a second area (S2) for collecting the bags in packs, comprising at least one rotor (14) carrying a pair of supports (17) for the bag (P) and suction means to fix the bag (P) to the support while the rotor (14) rotates. The device advantageously comprises means (18) designed to maintain said support (17) in a position parallel to itself during the movement between the first area (S1) and the second area (S2).

13 Claims, 7 Drawing Sheets

(56) References Cited

U.S. PATENT DOCUMENTS

| | | | |
|---|---|---|---|
| 4,645,063 A * | 2/1987 | Seragnoli | 198/450 |
| 4,858,904 A * | 8/1989 | Lindblom | 270/58.18 |
| 4,884,389 A * | 12/1989 | McGregor | 53/571 |
| 5,327,803 A * | 7/1994 | deMey, III | 83/152 |
| 5,911,553 A * | 6/1999 | Pickering et al. | 414/27 |
| 5,927,474 A * | 7/1999 | Owen et al. | 198/475.1 |
| 7,281,621 B2 * | 10/2007 | Jahnke et al. | 198/471.1 |
| 7,462,148 B2 * | 12/2008 | Knuppel et al. | 493/315 |
| 7,621,712 B2 * | 11/2009 | Simmons | 414/793.9 |
| 2002/0192058 A1* | 12/2002 | Harsch et al. | 414/225.01 |
| 2008/0089002 A1* | 4/2008 | Pelrine et al. | 361/234 |
| 2010/0096241 A1* | 4/2010 | Lenherr | 198/377.04 |
| 2010/0167893 A1 | 7/2010 | Wilkerson et al. | |

* cited by examiner

DEVICE FOR FORMING PACKS OF PLASTIC BAGS

TECHNICAL FIELD

The present invention relates to the field of plants for producing plastic bags; more in particular, the object of the present invention is a device for forming packs of plastic bags.

STATE OF THE ART

One of the most used systems for producing plastic bags provides for welding stacked webs of plastic film and cutting them near the welding areas. Welding and cutting often occur at the same time, by means of a single member.

In many plants, welding and cutting occur in a first production line, usually by moving the webs towards the welding and cutting area, where the bag is produced.

Once the bag has been produced, it must be moved towards a collection area to be stacked on the previously produced bags, so as to form packs of bags.

One known way to form packs of bags is the so-called "Wicket". It provides for using a moving device comprising a rotor formed by (at least) two rotating drums that are keyed onto a common shaft and present a plurality of arms exiting in radial or nearly radial manner from the drum axis and are suitable to support a plastic bag. In particular, the arms of one drum are angularly paired with the arms of the other drum, so as to form pairs of coplanar arms axially spaced to form a planar support for the bag.

There are suction holes on each arm, that are connected with a suction system through ducts passing in the arms and the drums. The objet of this system is to keep the plastic bag in position on the two arms through vacuum.

Practically, the bag is translated from the welding and cutting area above a pair of arms of the Wicket rotor that keep the bag in position through suction. The rotor rotates bringing with itself the arms and, consequently, the bag. When the arms are rotated by 180° the bag is overturned in the collecting position, where it is released. In particular, the bag is provided, at an its own edge, with a pair of holes that, when the bag arrives in the collecting position, are centered relative to a complementary pair of pins or needles.

When the bag enters the needles, it is constrained at one edge to the needles, whilst the rest of the bag falls downwards, thus taking a mainly vertical orientation.

The following bags are inserted on the same needles and are stacked over the previous bag, so as to form a pack "hanging" from the needles, which will be subsequently moved towards a handling area, for example as described in the Italian patent application No. FI2008A000087 of the same applicant.

When the bag is inserted on the needles, the suction ends and therefore the arms no longer hold the bag.

Figure 1:
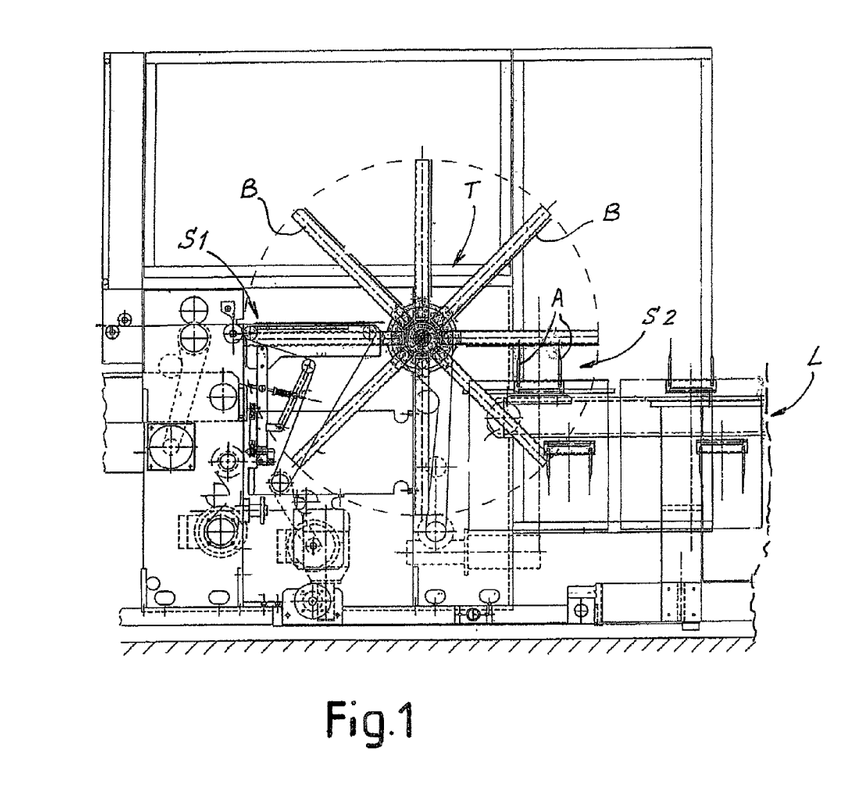
FIG. 1 is a side view of a device for forming packs of plastic bags according to the prior art.

FIG. 1, visible in the attached drawings, shows a side view of a device as described above, whilst FIG. 2 shows a front view of the plastic bag collecting area.

Figure 2:
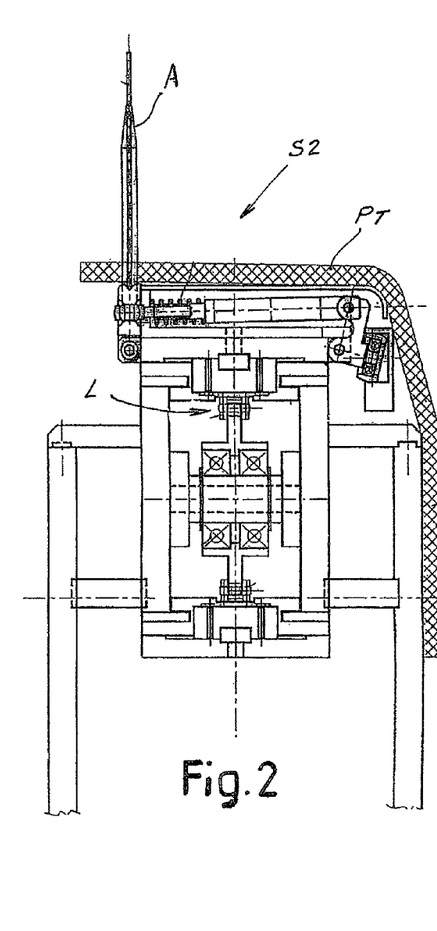
FIG. 2 is a front view of the collecting area for the plastic bags downward a known device as that of FIG. 1.

In particular, FIG. 1 shows the cutting and welding area S1, a drum T with arms B (a second drum is hidden by the first one), the collecting area S2 with pairs of needles A mounted on a moving line L. FIG. 2 shows the collecting area S2 with a pair of needles A mounted on the line L, and a pack of plastic bags Pt inserted on the needles A.

Even if known and appreciated by the market for many years, this device can be improved, for example as regards the so-called "sail effect", i.e. the resistance of the bag during rotation, due to which an extremely "enhanced" air suction is needed to prevent the bag from moving (a movement of the bag could cause a failure of the holes to align with the needles). In the operation of this device the air consumption is one of the highest cost.

Due to the "sail effect" the rotation speeds must be reduced (with a consequent decrease in production capacity), and more than two drums must be used (i.e. at least three arms) to support the bags of great dimensions (the distance between two arms being excessive).

An effort to overcome the above-described "sail effect" is disclosed in the patent document EP0388686. This document describes a wicket device for forming packs of bags, wherein the bags are translated remaining parallel to themselves. To do this, a particularly bulky mechanism must be however used, poorly effective in terms of adhesion of the bags to the moving supports.

OBJECT AND SUMMARY OF THE INVENTION

The object of the present invention is therefore a device for forming packs of bags that overcomes the drawbacks described above.

This and other objects, that will be more clear hereafter, are obtained through a device for forming packs of bags through moving from a first area, in which an already produced bag is arranged, towards a second collecting area for the bags in packs, according to the following claim 1.

Thanks to this solution, on the bag resting on the support carried by the rotor the "sail effect" does not occur, as contrarily occurs if support and bag rotate integrally with the rotor between the two areas, i.e. overturning the bag. This allows a significant decrease in the suction needed for maintaining the bags in position, with clear energy saves and advantages in terms of productivity and flexibility.

According to a first, particularly advantageous embodiment of the invention, there is a plurality of supports for the plastic bags. Each support is hinged on an arm projecting from the rotor transversally, preferably in a radial manner. The means for keeping the support in position parallel to itself during the rotor rotation comprise means for changing the angular position of the support around its own hinge axis for hinging to the arm according to the rotor angular position around the axis of rotation of this latter, so that the support does not change inclination at least along the path between the first and the second area of the device.

According to this first embodiment, the invention preferably comprises kinematic transmission means transferring the rotor rotary motion to the support, so that this latter rotates about its own axis in opposite direction relative to the direction of rotation of the rotor to maintain its orientation. A kinematic transmission transferring and changing the rotary motion between rotor and support allows greatly to simplify the way in which the support is maintained with its orientation. Alternatively, but increasing the structural and control complexity as well as the overall costs, it is possible for instance to use motorizations associated with each support that, through evaluation of the rotor angular position, control a change in the inclination of the support relative to the arm so as to maintain it parallel to itself during motion.

Adequately, these kinematic transmission means comprise an epicyclical gear train, allowing great simplification and compactness of the device.

In a preferred embodiment, this epicyclical gear train provides for a sun gear fixed relative to the ground or outer frame of the device, a carrier integral with the axis of rotation of the rotor, a planet gear for each arm hinged on the carrier and engaged on the sun gear; the planet gear is therefore kinematically connected with the axis of rotation of the support on the arm, with adequate reduction rate. The arm is integral with the carrier.

Preferably, the kinematic connection of the planet gear with the support provides for the connection of the planet gear with a belt or chain drive system, which is in turn connected with the axis of rotation of the support. In this way the mass of the rotor is greatly reduced, with great advantage for the lower energy necessary for moving the rotor.

More preferably, the planet gear is integral with and coaxial to a first toothed wheel meshing with a second toothed wheel integral with and coaxial to a first pulley connected through belt, or chain or other flexible drive member, with a second pulley integral with the support and coaxial to the axis of rotation of this latter.

Obviously numerous variants of these kinematic transmission means are possible. For example, instead of the belt or chain drive system a gear cascade system can be used, both of the type with toothed wheels with axis of rotation parallel to one another, and with pinion-rack systems, pinion worm gear etcetera.

According to a preferred embodiment, the sun gear is integral with an air distribution bell, fixed relative to the ground, i.e. not rotating with the rotor, on the periphery of which a crown rotates coaxially in a pneumatic sealed manner, the arms developing from this crown. Practically, this crown is integral with the carrier. In particular, the air distribution bell provides for a chamber developing for an angular segment substantially corresponding to the angular stroke followed by the rotor to bring an arm from the first area of picking up the bag to the second area of collecting the bags in packs. The arms present inside themselves a duct communicating respectively with the chamber and with the suction holes present on the support. The chamber directly communicates with the suction system by means of a duct exiting from the chamber itself.

According to some preferred embodiments, each support is hinged to the respective arm in a substantially median longitudinal position of the same support, i.e., relative to the longitudinal extension of the arm, in a position nearly at half of this extension, preferably in a lower position than the rest surface of the bag on the support.

According to another aspect, the invention relates to a device for forming packs of bags for moving from a first area, in which an already produced bag is arranged, to a second area for collecting the bags in packs; this device comprises at least one rotor carrying a plurality of supports for the bags, exiting from the rotor; suction means are present, to fix the bag on the support while said rotor rotates; means are associated to the support to maintain it in a position parallel to itself, i.e. preferably with a substantially horizontal arrangement, during the movement between the first and the second area; said means for keeping the support in a position parallel to itself during the rotor rotation comprise means for changing the angular position of the support around its own hinge axis for hinging to the arm according to the rotor angular position around the axis of rotation of this latter, so that the support does not change inclination at least along the path between the first and the second area of the device; each support is hinged to the respective arm in a substantially median longitudinal position, i.e., relative to the longitudinal extension of the arm, in a position nearly at half of this extension, preferably in a lower position than the rest surface of the bag on the support.

The practical advantages deriving from positioning the arm's hinge point in the centerline of the bag-holder support, can be achieved also with means for maintaining it in a position parallel to it different from those described above (even if particularly synergic with this arrangement).

Again with reference to this second aspect of the invention, the invention preferably comprises kinematic transmission means transferring the rotor rotary motion to the support, so that this latter rotates about its own axis in opposite direction relative to the direction of rotation of the rotor to maintain its orientation. A kinematic transmission transferring and changing the rotary motion between rotor and support allows greatly to simplify the way in which the support is maintained with its orientation. Alternatively, but increasing the structural and control complexity as well as the overall costs, it is possible for instance to use motorizations associated with each support that, through evaluation of the rotor angular position, control a change in the inclination of the support relative to the arm to maintain it parallel to itself during motion.

Again with reference to this second aspect of the invention, these kinematic transmission means comprise an epicyclical gear train, allowing great simplification and compactness of the device.

Again with reference to this second aspect of the invention, this epicyclical gear train provides for a sun gear fixed relative to the ground or outer frame of the device, a carrier integral with the axis of rotation of the rotor, a planet gear for each arm hinged to the carrier and meshing the sun gear; the planet gear is therefore kinematically connected with the axis of rotation of the support on the arm, with adequate reduction rate. The arm is integral with the carrier.

Again with reference to this second aspect of the invention, the kinematic connection of the planet gear with the support provides for the connection of the planet gear with a belt or chain drive system, which is in turn connected to the axis of rotation of the support. In this way the mass of the rotor is greatly reduced, with great advantage for the lower energy necessary for moving the rotor.

More preferably, the planet gear is integral with and coaxial to a first toothed wheel meshing with a second toothed wheel integral with and coaxial to a first pulley connected through belt, or chain or other flexible drive member, with a second pulley integral with the support and coaxial to the axis of rotation of this latter.

Obviously numerous variants of these kinematic transmission means are possible. For example, instead of the belt or chain drive system a gear cascade system can be used, both of the type with toothed wheels with axis of rotation parallel to one another, and with pinion-rack systems, pinion worm gear etcetera.

Again with reference to this second aspect of the invention, the sun gear is integral with an air distribution bell, fixed relative to the ground, i.e. not rotating with the rotor, on the periphery of which a crown rotates coaxially in a pneumatic sealed manner, the arms developing from this crown. Practically, this crown is integral with the carrier. In particular, the air distribution bell provides for a chamber developing for an angular segment substantially corresponding to the angular stroke followed by the rotor to bring an arm from the first area of picking up the bag to the second area of collecting the bags in packs. The arms present inside themselves a duct communicating respectively with the chamber and with the suction holes present on the support. The chamber directly communicates with the suction system by means of a duct exiting from the chamber itself.

Adequately, the invention also provides for a process for forming packs of bags comprising: i) arranging a bag on at least one support, ii) translating the support with the bag along a trajectory with concavity downward, so that the support and the bag do not change their space orientation (the support remains therefore always parallel to itself), iii) releasing the bag moved from the support onto a collecting area provided with hanging means for a plurality of bags stacked to form a pack.

BRIEF DESCRIPTION OF THE DRAWINGS

Further characteristics and advantages of the present invention shall be more apparent from the description of a preferred, although not exclusive, embodiment, illustrated by way of non limiting example in the attached tables of drawings, wherein:

FIG. 6b is a functional diagram of part of FIG. 6a;

DETAILED DESCRIPTION OF AN EMBODIMENT OF THE INVENTION

With reference to the previously cited figures, and in particular to FIG. 3, a device for forming plastic bags according to the invention is indicated in its entirety with the reference number 10 and is arranged between two areas, respectively a first area S1 constituting the end of the manufacturing line 11 of the plastic bags, and a second area S2 for collecting in packs the bags coming from the area S1 that must be subsequently moved along a moving line 12 towards a handling area (not shown in the figures), similarly to the so-called Wicket method. In the collecting area S2 means are present for grouping the bags, for example constituted by pairs of needles A onto which the bags are inserted over one another so that the bags hang on the needles, according to a known method, even if with insertion trajectory different than that usually followed by the bags in known devices. These needles, also defined as hanging means, practically constitute means for hanging the bags in packs.

More in particular, the area S1 provides for a cutting and welding member 13 to obtain plastic bags laying on the plane of the line 11. From the cutting and welding position, the produced bag is moved over a moving support belonging to the device 10, as it will be better explained hereunder.

The moving line 12 for moving the bags toward the handling area provides for a catenary provided with a plurality of said equidistant pairs of needles A, passing for the collecting area S2, in a substantially known manner. The plastic bags, indicated with P, are provided, near an end edge, with a pair of through holes P' (in FIG. 5 the bags P are shown in dotted line) to allow insertion of the needles. Practically the device 10 moves the bags P, bring them in the area S2 and make the holes P' of the bags P match with the needles A, so that the bags hang to the needles. The pairs of needles can also be of the type that can be inclined to facilitate insertion of the bags.

The device 10 for forming packs of bags comprises a pair of rotors 14 hinged onto a rotation shaft 15, preferably with horizontal axis X of rotation, spaced from one another by an adequate distance according to the dimensions of the bags P.

From each rotor 14 arms 16 extend (in this example in a substantially radial manner relative to the axis X of rotation), that are integral with the rotor at an outer crown of this latter. At the free end of each arm a support 17 is hinged for the plastic bag P. In particular, the support 17 is formed, in this embodiment, by a hollow beam with substantially quadrangular cross section. The upper face of the beam defines the rest surface 17A for the plastic bag P. On the same rest surface 17A a plurality of small holes 17B are present, putting into communication the outside and the inside of the beam and constituting the end part of a suction system that has the purpose of maintaining the bag in position on the support 17, as it will be better specified hereafter.

Figure 3:
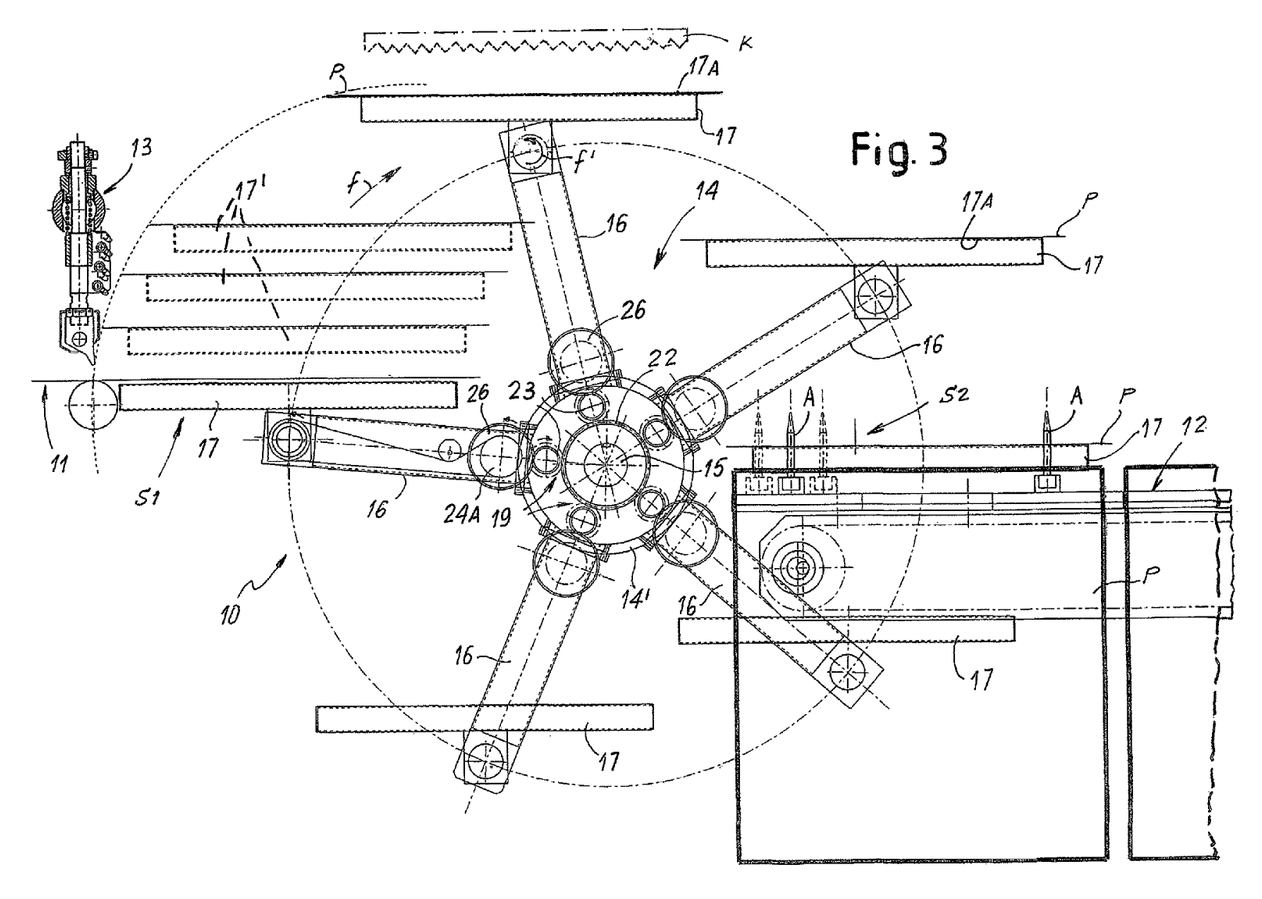
FIG. 3 is a schematic side view of a device for forming packs of plastic bags according to the invention.
Figure 4:
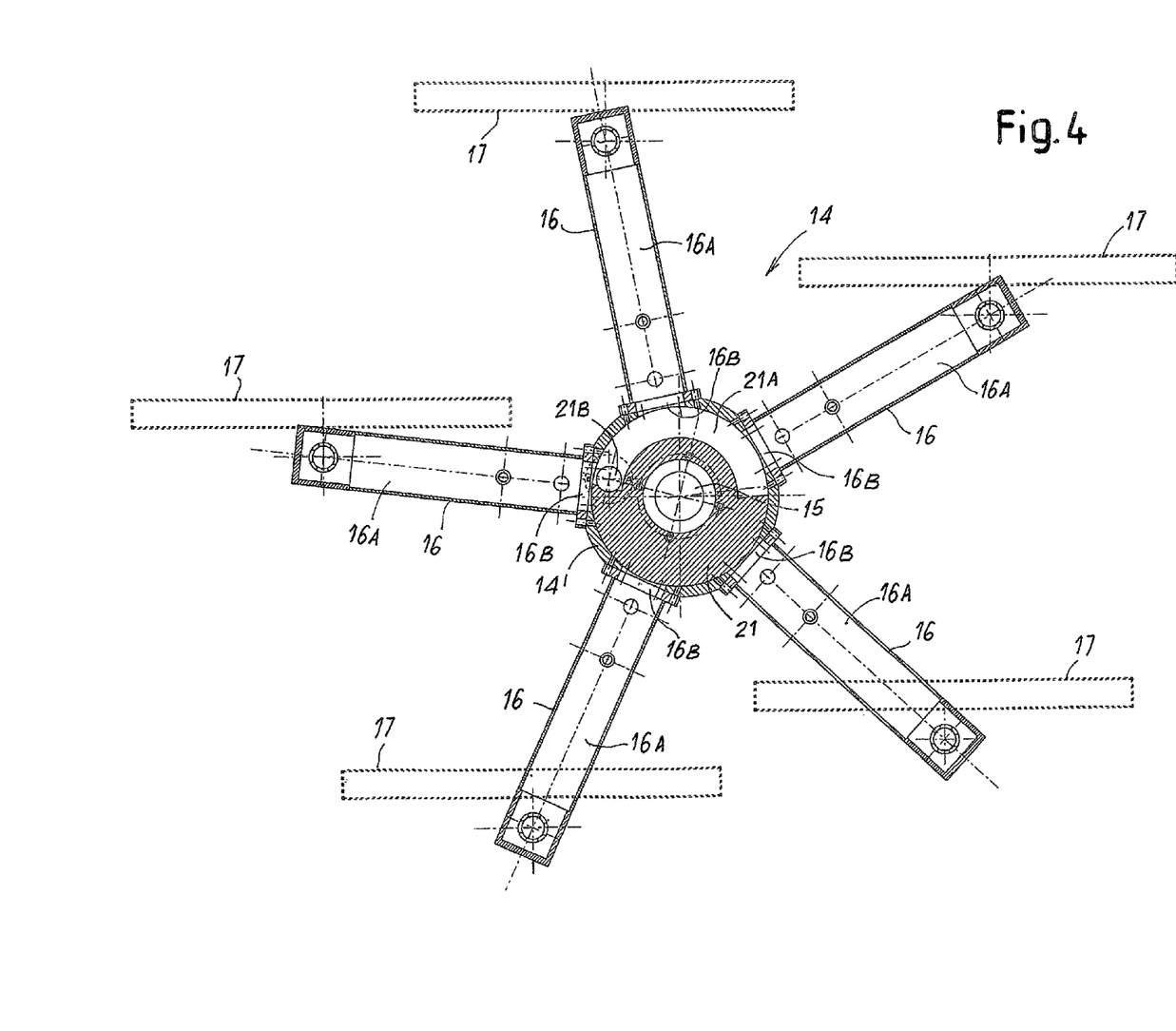
FIG. 4 is cut-away schematic side view of the rotor of the forming device of FIG. 3, with associated arms and supports for the plastic bags.

It should be noted that in FIG. 3 number 17' indicates some sequential positions taken by a support 17 during the initial phase of moving a plastic bag.

The two rotors 14 present arms 16 oriented angularly in a corresponding manner, so that two arms 16 with the same angular position carry respective supports 17 with coplanar surfaces 17A so as to create two rest areas for each bag in all. The two rotors 14 practically move a single line of bags. Each bag is moved by both the rotors 14.

In this embodiment five arms 16 are present for each rotor 14. Obviously in other embodiments the number of arms can vary according to the production needs, starting obviously from a minimum number equal to an arm. Also the number of rotors can vary according to the needs, for example based upon the bag dimensions, according to the logic that the greater the number of supports for a bag the greater its rest surface. Also embodiments can be obviously implemented, where a single support is present constituted by a plane of sufficient dimensions for resting the bag stably.

According to the invention, to each support 17 are associated means 18 maintaining it in position parallel to itself, i.e., in this embodiment, preferably with a substantially horizontal arrangement, during the movement between the first area S1 and the second area S2.

In particular, in this embodiment, these means 18 for maintaining the support 17 in position parallel to itself comprise means for varying the angular position of the support around its own hinge axis for hinging to the arm according to the angular position of the rotor 14 around its axis X of rotation. Practically, to a movement of the rotor in the direction of the arrow f in FIG. 3 corresponds a rotation of the support 17 on the respective arm in the direction of the arrow f, i.e. a rotation in opposite direction than f, by such an angular entity that the support never changes space orientation, always remaining parallel to itself. The support 17 makes a rotation in a reference system integral with the respective arm 16 while, in the fixed reference system relative to the frame of the device, it performs a translation motion along a curve trajectory (for example elliptical) obtained from the combination of the rotary motion of the arm 16 and of the rotation of the support 17 relative to the arm 16. The final result is that the support 17, and thus the bag arranged on it, does not change in inclination, obviously relative to a reference system outside the device (for example fixed to its frame or to the ground), along the path between the first and the second area of the device.

Advantageously, according to a preferred embodiment, described herein, each support 17 is hinged to the respective arm 16 in a substantially median longitudinal position, i.e., relative to the longitudinal extension of the arm, in a position nearly at half of this extension, preferably in a lower position than the rest surface 17A of the support 17. This arrangement allows to obtain a particularly compact device configuration, with consequent reduction in the distance between area S1 and area S2 and therefore with an overall reduction in the length of the line.

In the present embodiment, the means 18 allowing this translation motion of the support along a curve trajectory provide for kinematic transmission means designed to transfer the rotary motion of the rotor 14 on the axis X to the support 17, so that this latter rotates about its own axis on the arm 16 in opposite direction relative to the direction of rotation of the rotor 14 to maintain its horizontal orientation.

Figure 5:
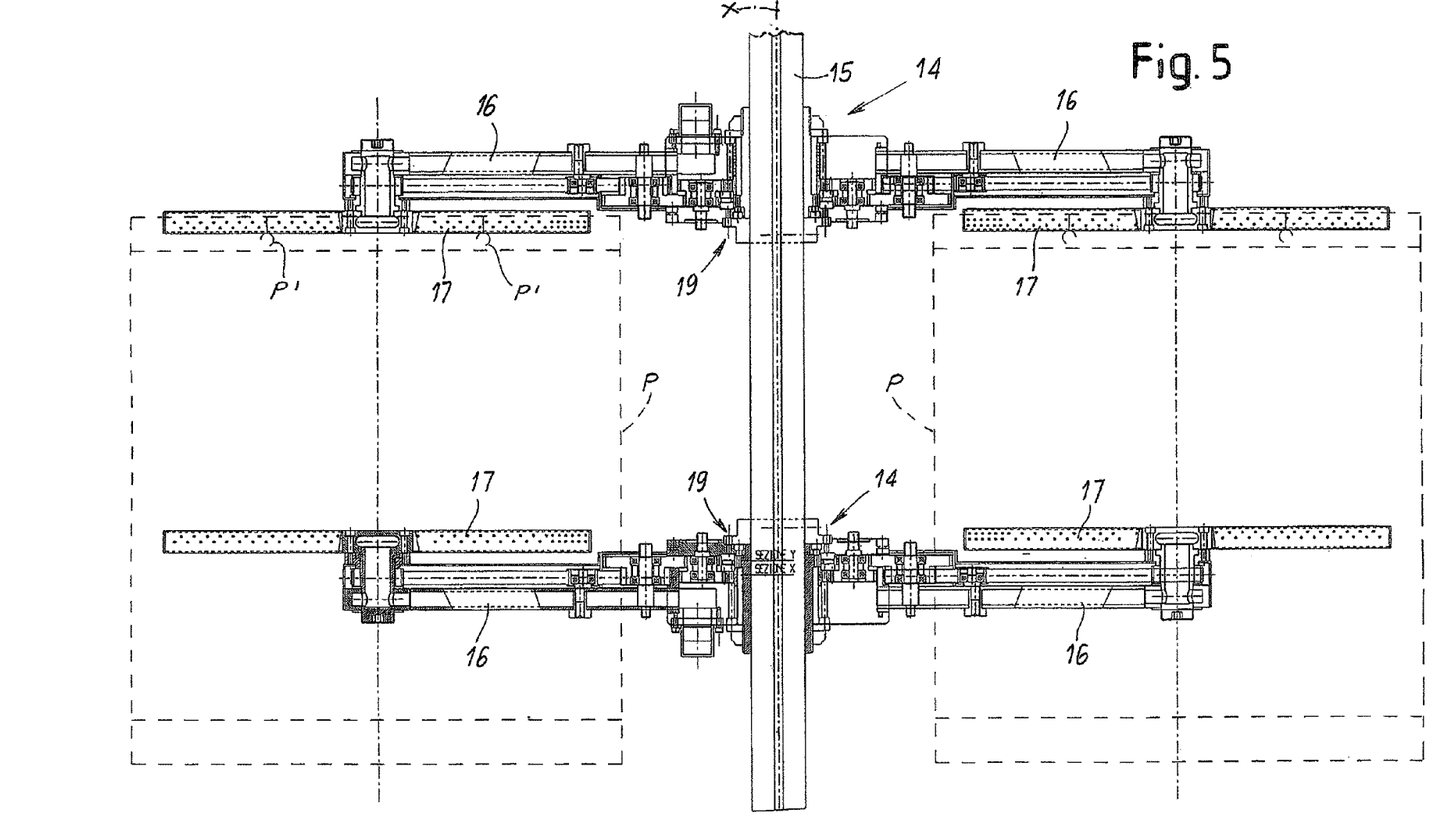
FIG. 5 is a partially cut-away schematic top view of the rotor of the device of FIG. 3, with associated arms and supports for the plastic bags.
Figure 6A:
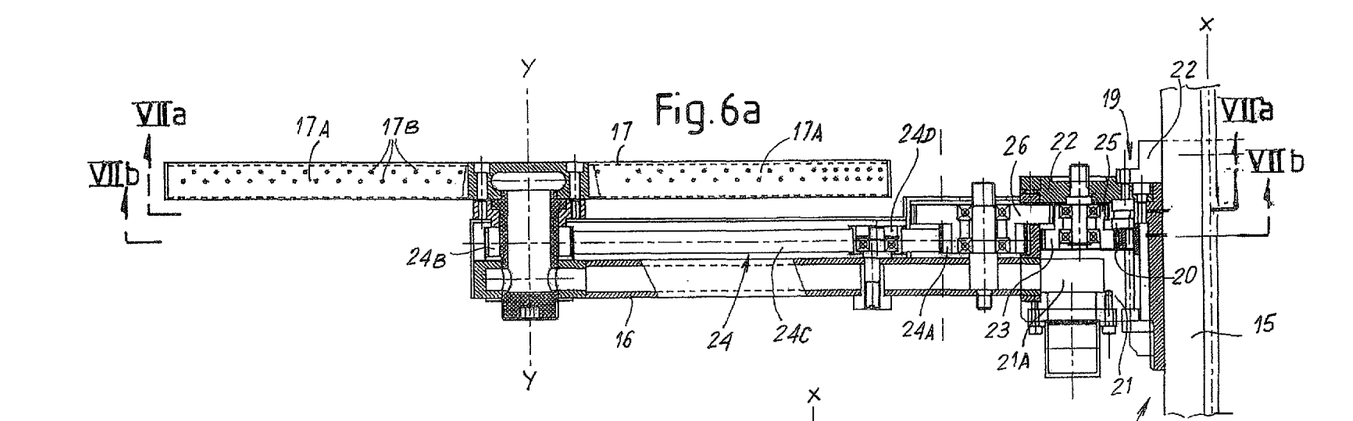
FIG. 6a is an enlargement of a portion of the rotor as in FIG. 5.
Figure 6B:
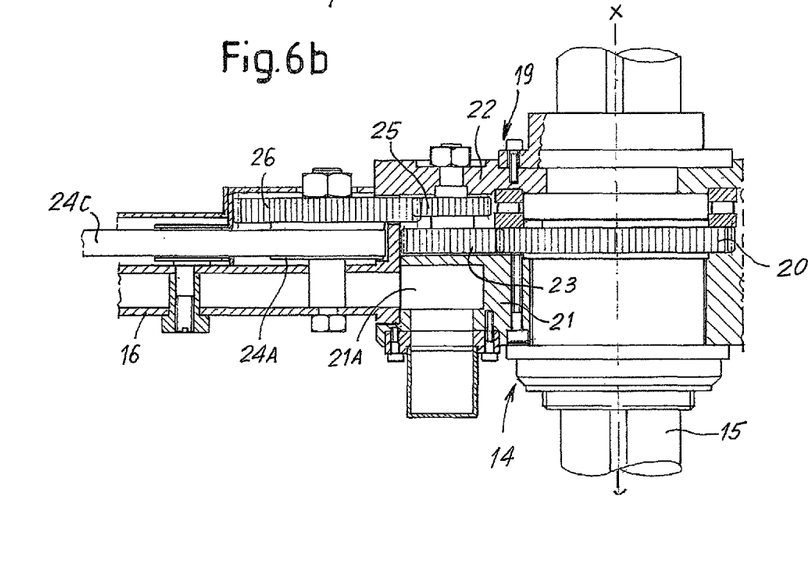
Figure 7A:
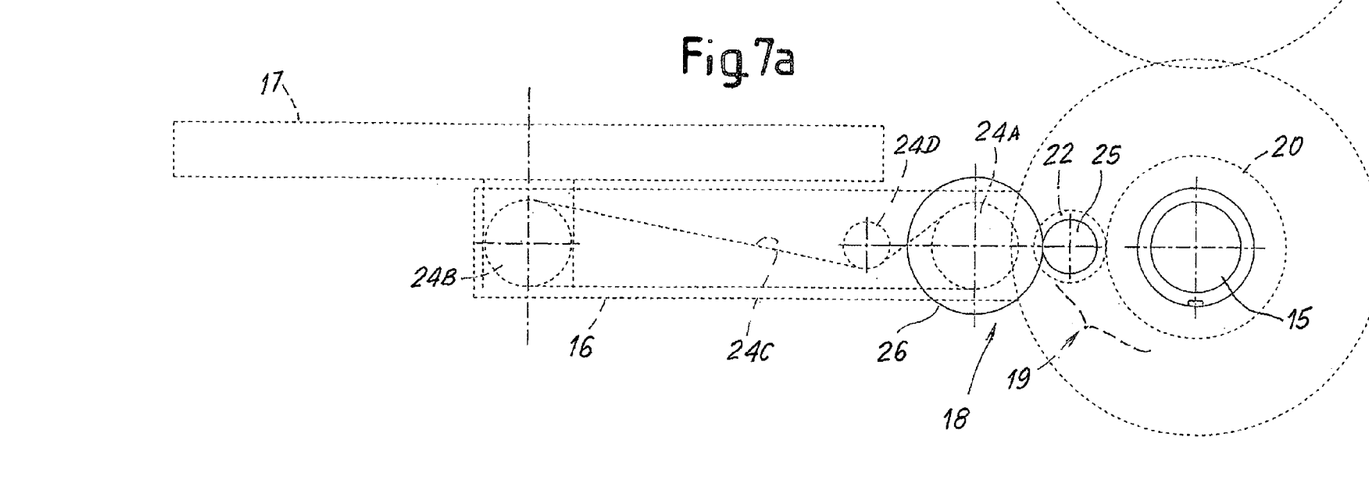
FIGS. 7a and 7b are two schematic side views, according to two distinct parallel planes VIIa and VIIb, of the kinematic connection of the bag support to the rotor.
Figure 7B:
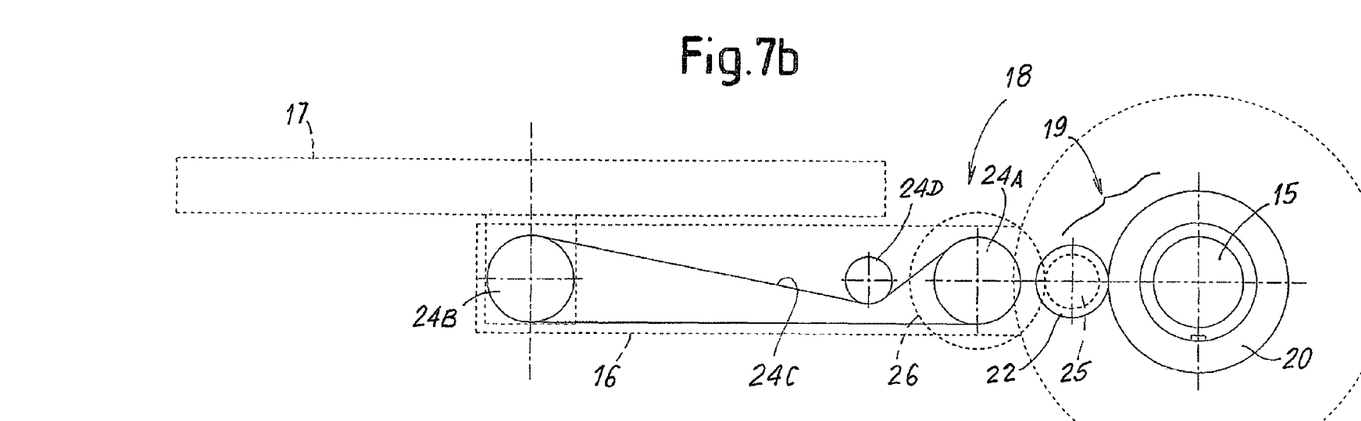

Adequately, the kinematic transmission means comprise, in the preferred embodiment, an epicyclical gear train 19 (see in particular FIGS. 5, 6, and 7). Gear train means a system constituted by toothed wheels, of any type, engaged to one another and arranged so that the rotation of one of them makes all the other wheels rotate. As it is known, epicyclical gear train means a gear train wherein at least one of the shaft onto which the wheels are keyed moves during the operation of the gear train. This shaft is called "carrier", whilst the wheels keyed on it are called "planet gears". When the wheels meshing the planet gears are with outer teeth, they are called "sun gears".

In the example in question, the epicyclical gear train 19 advantageously comprises (see FIG. 6b, where the structure of the rotor with epicyclical gear train has been schematized and simplified to better visualize the components) a sun gear 20 (constituted by a toothed wheel) fixed relative to the ground or the outer frame of the device, and obviously coaxial with the axis X of rotation of the rotor. It is integral with a cylindrical air distribution bell 21 (centrally perforated for the passage of the rotation shaft 15 of the rotor), better described hereunder; FIG. 6b shows the sun gear partially cut-away and in a single piece with the bell 21, even if it is preferably produced separately from the bell but integral with it during use). The epicyclical gear train therefore comprises a carrier 22, integral with the rotation shaft 15 of the rotor, onto which five planet gears 23 are pivoted (constituted by toothed wheels), one for each arm 16. In FIG. 6b shaft 15, carrier 22 and arm 16 are schematized as a single piece (but in reality they are constituted by separate pieces integral during use).

Each planet gear 23 is kinematically connected, with an adequate reduction degree, with the axis Y of rotation of the support 17 pivoted on the arm 16 associated with the corresponding planet gear. In particular, according to the preferred embodiment, this kinematic connection provides for a belt drive 24. More in particular, each planet gear 23 is in a single piece or keyed integrally onto a first toothed wheel 25, which is in turn engaged with a second toothed wheel 26 pivoted on the respective arm 16 to which the planet gear refers. This second toothed wheel 26 is in a single piece with or integrally keyed onto a first pulley 24A of the belt drive 24. A second pulley 24B is in a single piece with or integrally keyed onto the rotation pin 27 of the support 17 on the arm 16. Between the two pulleys 24A and 24B a belt 24C is arranged. The belt drive 24 furthermore comprises a belt-tightening roller 24D arranged on the arm 16. FIG. 7a and FIG. 7b show the scheme of the belt drive 24 with its connection to the epicyclical gear train 19, according to two parallel view planes, the first passing through the toothed wheels 25 and 26, and the second passing through the sun gear, the planet gears and the pulleys. The epicyclical gear train 19 is practically the motor of the belt drive 24.

It should be noted that the axes of rotation of the rotor (and therefore of the carrier), of the sun gear, of the planet gears, of the toothed wheels, and of the pulleys lay on a same plane, preferably the centerline plane of the arm 16.

It should be furthermore noted that the belt drive 24 is arranged on the outside of the arm 16.

The gear ratio between rotor 14, epicyclical gear train 19 and belt drive 24 is such that the support 17, during the rotation of the rotor 14, rotates relative to the arm 16 remaining always parallel to itself during movement between first area S1 and second area S2.

The way for sucking air from the holes arranged on the supports 17 is substantially analogous to what already known. At the centre of the rotor 14 is arranged the cylindrical distribution bell 21, fixed relative to the ground. Practically the rotor 14 rotates on the bell 21. Inside the bell 21 a chamber 21A is defined, hydraulically connected with suction means (not shown in the figures) through the aperture 21B defined at the end of the same chamber 21A. Each arm 16 is fixed on the outer crown 14' of the rotor 14 and is hollow inside, defining a duct 16A, with end aperture 16B defined on the rotor. The distribution chamber is closed, on its outer side, by the rotor 14. In particular, the chamber 21A is defined for an angular portion corresponding to the angular stroke of the rotor useful to bring a bag from the first area S1 to the second area S2. During rotation, the rotor therefore brings the end apertures 16B of the arms 16 to pass cyclically on the distribution chamber 21A (suction phase, during which the ducts 16A of the arms communicate with the distribution chamber 21A) and on the full part of the distribution bell (nom-suction phase, corresponding to the return of the arms 16 from the second area S2 to the first area S1, during which the ducts of the arms are closed by the outer body of the bell 20).

Figure 8:
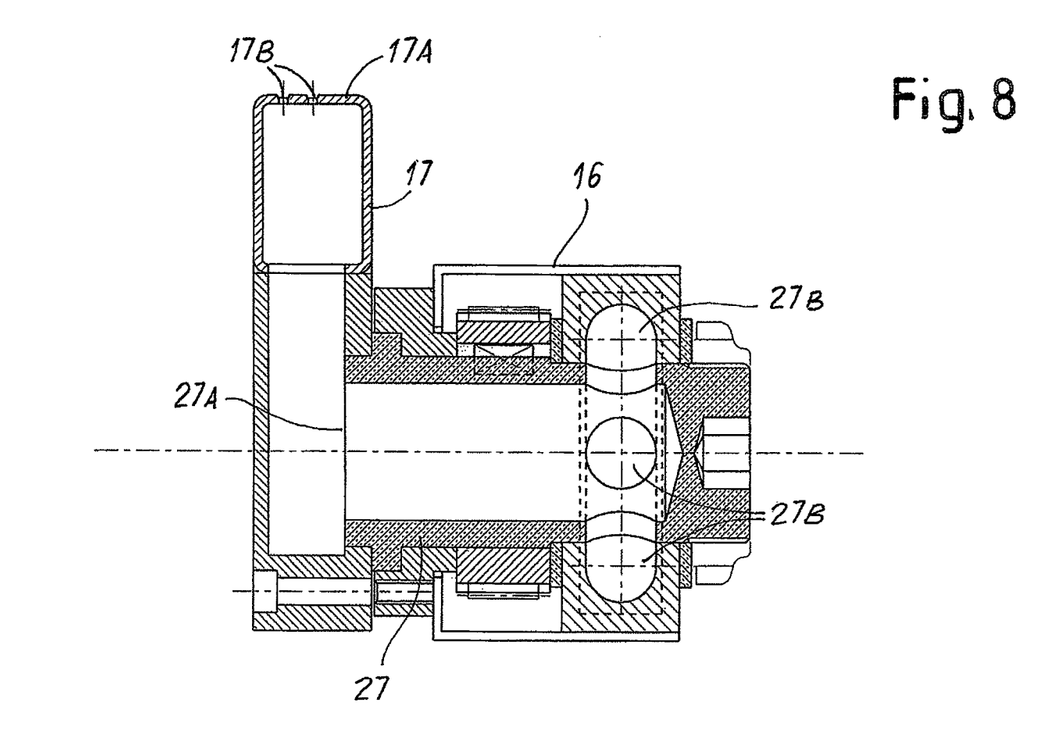
FIG. 8 is a cut-away view of the rotation pin of the support for the plastic bags.

At the opposite end relative to the end aperture 16B of the duct 16A the rotation pin 27 of the support 17 is arranged. The pin 27 is hollow and presents at an end a first passage 27A for the inside of the support 17 and, at the opposite end, second passages 27B, defined on the flanks of the pin, communicating with the duct 16A of the arm 16, with adequate hydraulic seals.

Operation of the device is as follows.

A plastic bag is finished at the cutting and welding member 13, and therefore moved above a pair of supports 16, with their surface for resting the bags substantially aligned with the moving line 11 so as to receive a bag P. The rotors 14 rotate and integrally pull the arms 16 and the corresponding supports 17 with consequent movement of the finished bag. In this phase the suction system is hydraulically connected with the suction holes 17B arranged on the surface 17A of the two supports, as the ducts 16A defined on the corresponding arms 16 are open on the distribution chamber 21A.

During the rotation of each rotor 14 (the two rotors rotate integrally) the respective carrier 22 integral with it also rotates as well as the planet gear 23 (the description is made with reference to a single arm/support, for the sake of simplicity). Engagement of this latter with the sun gear 20, fixed relative to the ground, causes the rotation of the planet gear relative to the carrier, with consequent rotation of the second toothed wheel 26 connected with the planet gear through the first toothed wheel 25. Consequently, the first pulley 24A, the belt 24C and the second pulley 24B rotate, with consequent rotation of the pin 27 and of the support 17 integral with it. The reduction degree is such that the support 27 remains parallel to itself during all the rotation of the rotor.

When the support with the bag achieves the second area S2 (without changing inclination relative to the ground), the needles A are centered on the holes of the bag, and thanks to the continuous rotation of the support the bag remains hung to the needles whilst the support returns toward the area S1.

It should be noted that the translation of the supports 17 is such that they always remain horizontal, and therefore also the bags arranged on them remain horizontal, therefore during the relative insertion phase of the bags onto the needles A the pairs of holes P' on a bag move toward the respective needles A contemporaneously, at the same height level. In this configuration the phenomena are therefore avoided of small local tears that can occur with Wicket devices of the traditional type, due to the fact that the bags are moved through rotation by 180° and therefore the holes move toward the needles in a staggered manner (the hole nearest the axis of rotation is inserted on the respective needle before the other hole).

In the return stroke of the supports from the second area S2 to the first area S1 there is no suction from the holes 17B, as the ducts of the arms are closed by the body of the distribution bell.

As it is clear apparent from the description above, the invention also relates to a process for forming packs of bags comprising arrangement of a bag on the pair of supports 17 passing across the first area S1 and the subsequent translation of the supports 27 with the bag along a trajectory providing for an initial upward part and a final downward part toward the second area S2 where the pairs of needles A are arranged, i.e. along a trajectory with concavity facing downward, preferably a curve trajectory. As already mentioned, during their translation the supports 17 do not vary their space orientation, i.e. they always remain parallel to themselves (obviously a translating rigid body, due to the same definition of translation, does not vary its space orientation. i.e. it always moves parallel to itself).

Once the supports 17 with the bag arrive in the second area S2, they are released on the needles A, constituting hanging means. Practically a plurality of bags are put over one another and stacked to form a pack hanging on the needles A. The pack is constrained to these needles and "falls" downward.

Obviously the described invention provides for the set objectives. In fact, practically there is the total elimination of the "sail" effect, as the bag is not overturned, thus offering an actually lower air resistance than in the case of overturning. This results in a reduced need of the suction power, with reduction also by 75% of the power usually used relative to the case of supports rotating integrally with the rotors.

The elimination of the sail effect also allows to increase the rotation speed, with obvious reduction in the production times (increase in productivity).

The elimination of the sail effect allows to work with a greater range of bag formats movable with only two rotors, with great advantage for the production flexibility of the bag production line.

In addition, the elimination of the sail effect allows to improve the suction of the welding fumes from the first area S1 through adequate suction means arranged above this area. In fact, in the known devices the rotary motion of the bags pushes the welding fumes toward the second area S2 and below the rotor, actually limiting the suction of the fumes above the first area S1 to a fraction of the really produced fumes.

The less complex movement of the bag, in particular according to a translation with always horizontal direction, also entails a better accurateness in positioning the bag during the interaction with the needles for forming packs of bags.

The translation curve trajectory with the always horizontal support allows a lower bulk of the rotor in the moving area relative to the case of supports rotating integrally with the rotors, and in particular in the upper area (forward stroke) and in the lower area (backward stroke).

In this regard it should be noted that the smaller bulk, in particular in the device upper area, allows to use an electrostatic charging equipment for the plastic bags allowing a better adhesion thereof to the supports 17. This equipment is schematized in FIG. 3 with the letter K, and is constituted for instance by an electro-statically charged bar (for example presenting a plurality of tips) arranged above the highest area of the device, i.e. the area of maximum height for the supports 17 during translation. It is preferably arranged so that when the support carrying the part of bag with the holes P' is in the position of maximum height of its translation, it is put over and aligned with it, maintaining from it an adequate distance. Practically the lower K and the support 17 serve as armatures of a capacitor, electrically charging the bag arranged between them, actually allowing a greater adherence thereof to the support and therefore allowing a further reduction in the necessary suction air quantity. Obviously this equipment is optional as regard the inventive concept of the described device, and it can be used, if necessary, with plastic bags allowing an adequate electrostatic charge. Obviously, the application of this equipment is particularly synergic thanks to the reduced bulk in the upper part of the machine.

It is understood that what illustrated purely represents possible non-limiting embodiments of the present invention, which may vary in forms and arrangements without departing from the scope of the concept on which the invention is based. Any reference numbers in the appended claims are provided for the sole purpose of facilitating the reading thereof in the light of the description hereinbefore and the accompanying drawings and do not in any way limit the scope of protection of the present invention.

The invention claimed is:

1. A device for forming packs of bags for moving from a first area, in which an already produced bag is arranged, to a second area for collecting the bags in packs, the device comprising:
   at least one rotor carrying at least one support for a bag;
   a suction means for constraining the bag to said support while said rotor rotates; and
   a means for maintaining said at least one support in a position during movement between said first area and said second area, said means for maintaining said support in said position comprising a kinematic transmission means for transferring rotary motion of said rotor to said at least one support so that the at least one support is able to rotate around an axis of hinging to a respective arm exiting from said rotor, in an opposite direction relative to a rotation direction of said rotor, maintaining a constant space orientation, said kinematic transmission means comprising an epicyclical gear train, said epicyclical gear train comprising a sun gear fixed relative to the ground, a carrier rotating integrally with an axis of rotation of said rotor, a planet gear for a respective arm, hinged to said carrier and meshed with said sun gear, each arm being integral with said carrier, said planet gear being kinematically connected to the axis of rotation of said support hinged on said arm, said sun gear being integral with an air distribution bell, fixed relative to the ground, on a periphery of which a crown is able coaxially to rotate in a pneumatic sealed manner, said crown being integral with the carrier and said at least one arm extends from said crown, said air distribution bell comprising a chamber developing for an angular segment substantially corresponding to an angular stroke followed by said rotor to bring said at least one arm from the first area to said second area, said at least one arm comprising a duct, said duct being provided inside of said at least one arm, said duct communicating respectively with said chamber and with suction holes present on the at least one support, said chamber communicating directly with the suction means by means of a duct exiting from the chamber.

2. A device as claimed in claim 1, further comprising:
another support to provide at least a plurality of said supports, each of said supports being hinged to a respective arm exiting transversally from the respective rotor, said means for maintaining said at least one support in said position during the rotation of the rotor comprising a means for varying an angular position of said at least one support about the axis for hinging to the respective arm according to an angular position of said rotor around said axis of rotation of said rotor, so that said at least one support maintains constant space orientation or inclination at least along a path between said first area and said second area.

3. A device as claimed in claim 2, further comprising at least another rotor to provide two rotors.

4. A device as claimed in claim 1, wherein the kinematic connection of said planet gear with said at least one support comprises a connection of the planet gear with a belt or chain drive system, which is connected with the axis of rotation of said support, said belt drive being provided on an outside of said arm.

5. A device as claimed in claim 1, wherein said planet gear is integral with and coaxial to a first toothed wheel meshing with a second toothed wheel integral with and coaxial to a first pulley connected through a belt or chain with a second pulley integral with said support and coaxial to the axis of rotation of the support.

6. A device as claimed in claim 1, wherein axes of rotation of the carrier, of said sun gear, of said planet gear, of toothed wheels and of pulleys lie on a same plane, preferably a centerline plane of the arm.

7. A device as claimed in claim 2, wherein each of said supports is hinged to the respective said arm in a substantially median longitudinal position of the support itself.

8. A device as claimed in claim 7, wherein each of said supports is hinged to the respective said arm in a lower position than a rest surface of the bag on the support.

9. A device as claimed in claim 1, wherein in said second area of collection of the bags in packs collecting needles are present, on which hang said bags moved by said at least one support for relative insertion of the needles into corresponding holes obtained on edges of the bags.

10. A device as claimed in claim 1, further comprising:
an electrostatic charging apparatus for the bags, designed to allow electrostatic adhesion between the bags and said at least one support.

11. A device as claimed in claim 10, wherein said electrostatic charging apparatus is arranged in an upper part of the device, above a maximum allowable high position achievable by said at least one support, said electrostatic charging apparatus comprising an electro-statically charged bar, stacked and aligned with a part of said at least one support which can be associated with a part of the bags provided with holes for hanging on hanging means when said at least one support is in said maximum allowable high position.

12. A device for forming packs of bags for moving from a first area, in which an already produced bag is arranged, to a second area for collecting the bags in packs, the device comprising:
at least one rotor carrying at least one support for a bag;
a suction means for constraining the bag to said support while said rotor rotates; and
a means for maintaining said at least one support in a position during movement between said first area and said second area, said means for maintaining said support in said position comprising a kinematic transmission means for transferring rotary motion of said rotor to said at least one support so that the at least one support is able to rotate around an axis of hinging to a respective arm exiting from said rotor, in an opposite direction relative to a rotation direction of said rotor, maintaining a constant space orientation, said kinematic transmission means comprising an epicyclical gear train, said epicyclical gear train comprising a sun gear fixed relative to the ground, a carrier rotating integrally with an axis of rotation of said rotor, a planet gear for a respective arm, hinged to said carrier and meshed with said sun gear, each arm being integral with said carrier, said planet gear being kinematically connected to the axis of rotation of said support hinged on said arm, said kinematic connection of said planet gear with said at least one support comprising a connection of the planet gear with a belt or chain drive system, which is connected with the axis of rotation of said support, said belt drive being provided on an outside of said arm.

13. A device for forming packs of bags for moving from a first area, in which an already produced bag is arranged, to a second area for collecting the bags in packs, the device comprising:
at least one rotor carrying at least one support for a bag;
a suction means for constraining the bag to said support while said rotor rotates; and
a means for maintaining said at least one support in a position during movement between said first area and said second area, said means for maintaining said support in said position comprising a kinematic transmission means for transferring rotary motion of said rotor to said at least one support so that the at least one support is able to rotate around an axis of hinging to a respective arm exiting from said rotor, in an opposite direction relative to a rotation direction of said rotor, maintaining a constant space orientation, said kinematic transmission means comprising an epicyclical gear train, said epicyclical gear train comprising a sun gear fixed relative to the ground, a carrier rotating integrally with an axis of rotation of said rotor, a planet gear for a respective arm, hinged to said carrier and meshed with said sun gear, each arm being integral with said carrier, said planet gear being kinematically connected to the axis of rotation of said support hinged on said arm, said planet gear being integral with and coaxial to a first toothed wheel meshing with a second toothed wheel integral with and coaxial to a first pulley connected through a belt or chain with a second pulley integral with said support and coaxial to the axis of rotation of the support.

* * * * *